United States Patent [19]

Grabovac

[11] Patent Number: 5,703,277
[45] Date of Patent: Dec. 30, 1997

[54] TORQUE TOOL TESTER MACHINE

[75] Inventor: Bosko Grabovac, Arcadia, Calif.

[73] Assignee: Consolidated Devices, Inc., City of Industry, Calif.

[21] Appl. No.: 743,833

[22] Filed: Nov. 5, 1996

[51] Int. Cl.[6] ............................................. G01L 25/00
[52] U.S. Cl. ........................... 73/1.12; 73/1.09; 73/862.23
[58] Field of Search ...................... 73/1 C, 862.08, 73/862.26, 862.21, 862.22, 862.23, 1.09, 1.11, 1.12; 81/467, 477, 478

[56] References Cited

U.S. PATENT DOCUMENTS

| | | | |
|---|---|---|---|
| 2,411,931 | 12/1946 | McVey | 73/1 C |
| 3,364,725 | 1/1968 | Grabovac | 73/1 C |
| 3,456,485 | 7/1969 | Larson | 73/1 C |
| 4,171,647 | 10/1979 | Herrgen | 73/1 C X |
| 4,543,814 | 10/1985 | Heilman | 73/1 C |
| 4,562,722 | 1/1986 | Schuele et al. | 73/1 C X |
| 4,761,989 | 8/1988 | McDevitt | 73/1 C |
| 4,852,386 | 8/1989 | Grabovac et al. | 73/1 C |
| 5,099,678 | 3/1992 | Grabovac et al. | 73/862.08 X |
| 5,181,425 | 1/1993 | Livingston | 73/1 C X |

*Primary Examiner*—Elizabeth L. Dougherty

[57] ABSTRACT

A torque tool tester machine that includes a reaction means to hold a torque tool to be tested, an electronic torque transducer in rotary driving engagement with a torque transmitting part of the torque tool and a reduction gear train including a manually rotatable input shaft, an output shaft in rotary driving engagement with the transducer, and intermediate shaft and a pair of spur gear wheel with meshed gear teeth on the input and intermediate shafts, a stop plate, an electrically driven operating mechanism to move the stop plate into and out of interfering stopped engagement between advancing and next to meshed gear teeth on the spur gear wheels, an electronic processor connected between the transducer and the operating mechanism and operating to cause the operating mechanism to move the plate into interfering stopped engagement between teeth on the spur gear wheels when a voltage received by it from the transducer is of a predetermined value.

7 Claims, 4 Drawing Sheets

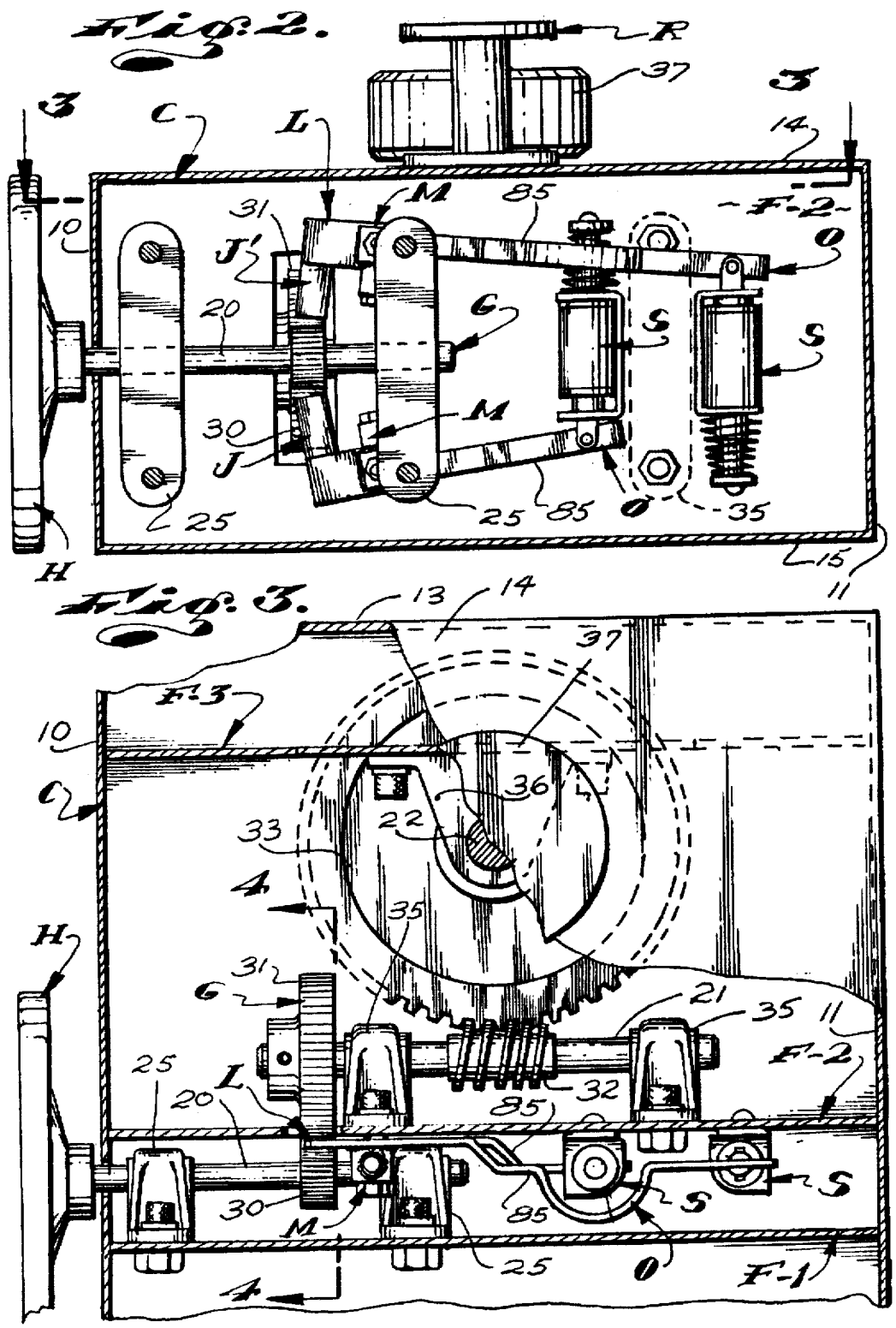

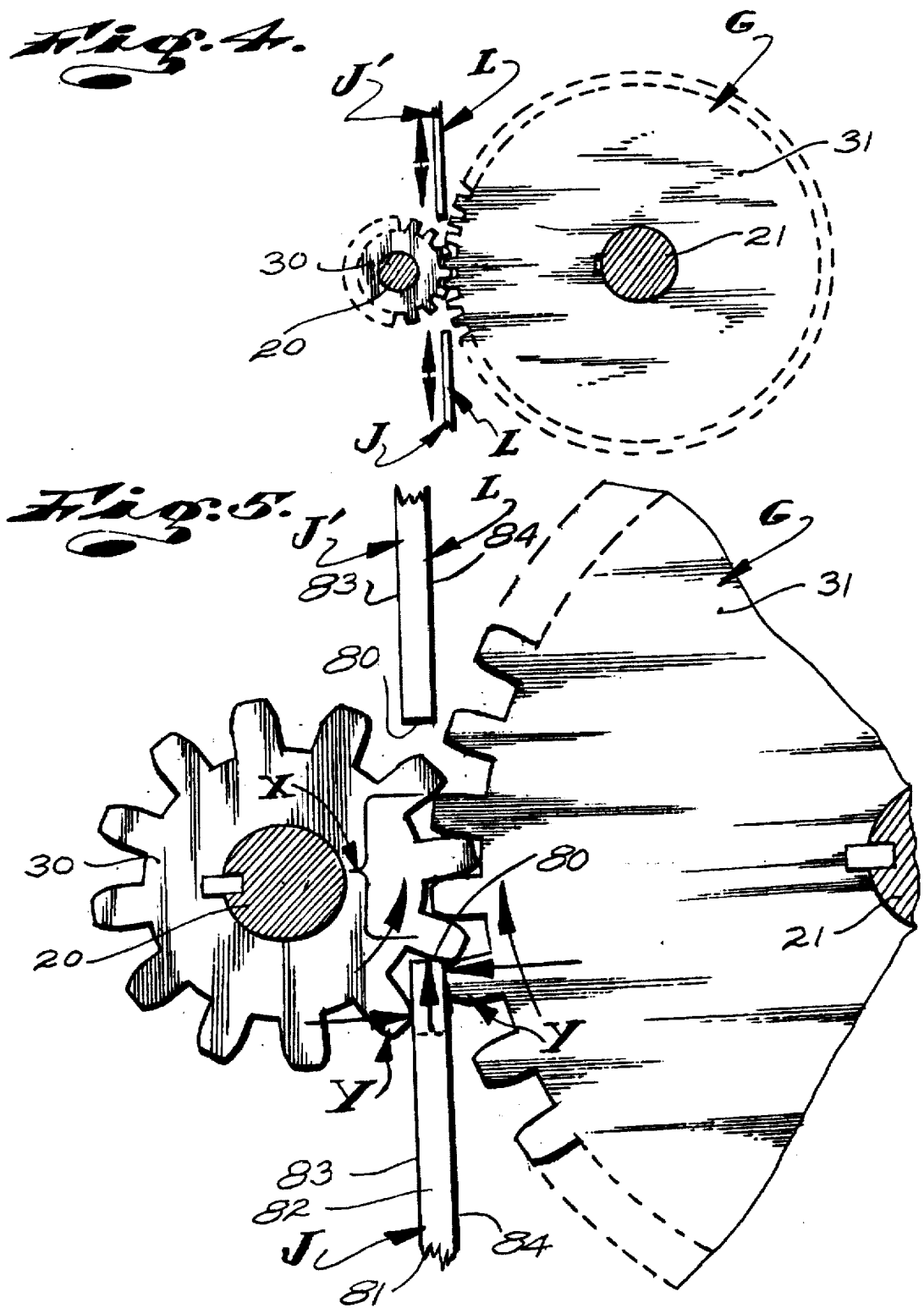

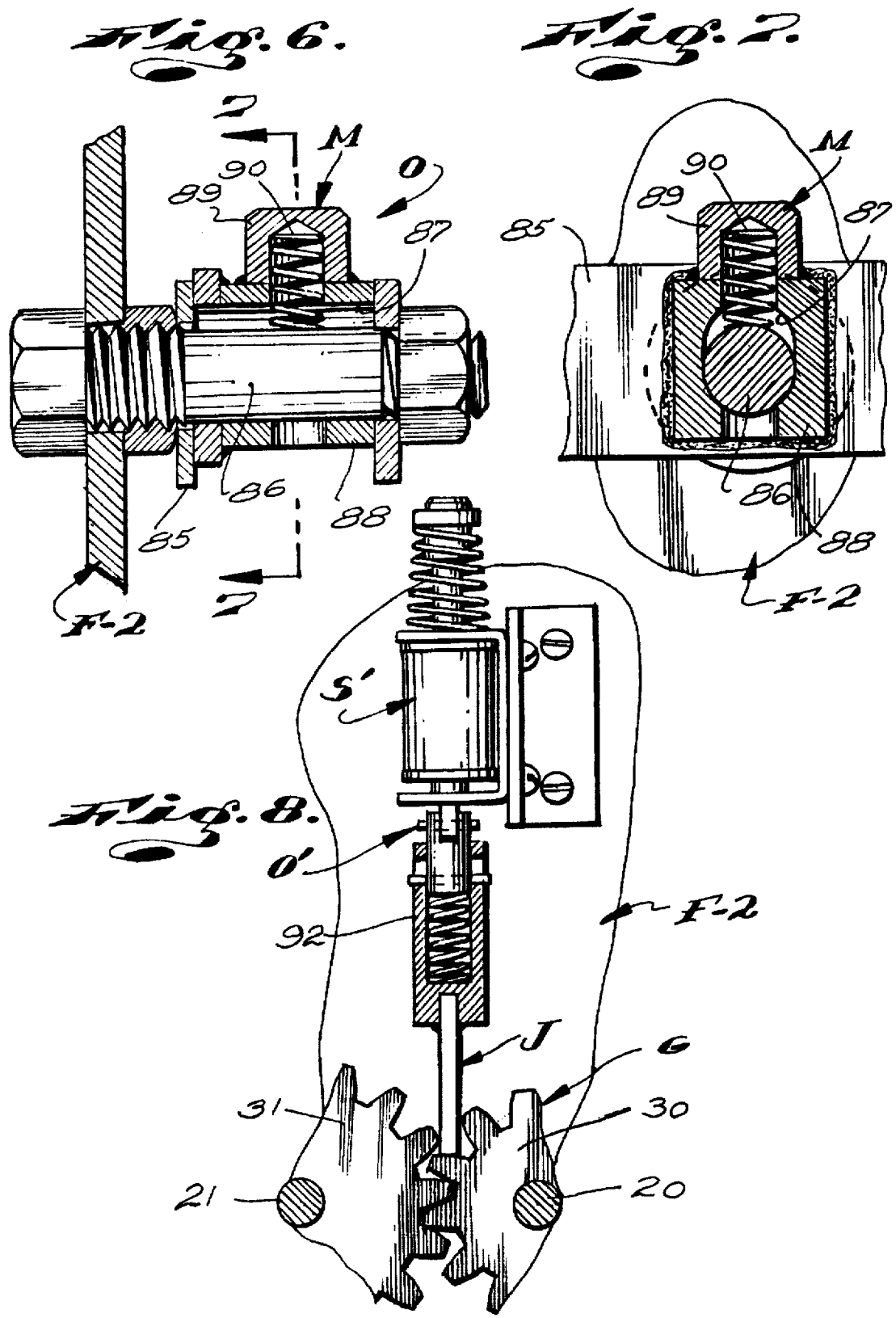

TORQUE TOOL TESTER MACHINE

BACKGROUND OF THE INVENTION

This invention has to do with the art of torque tools and is particularly concerned with that improved torque tool tester machine that is described in the following specification and illustrated in the accompanying drawings.

The use of torque tools, such as torque wrenches, that operate to limit and/or indicate the torsional forces applied to machine parts such as screw fasteners, has become highly developed and is well known throughout the mechanical arts.

It is also well known in the arts that such tools and/or wrenches are often rather delicate, precision devises that are subject to becoming out of adjustment and such that they will not function as intended.

It is also well known throughout the art that it is necessary and considered good practice to periodically test such tools to be sure that they are functioning properly. The frequency of testing such tools depends upon the use to which they are put. In some instances such tools are tested in accordance with arbitrarily established "Test schedules" that might provide for testing the tools once a month or every three or six months. In other instances it is mandated that such tools be tested prior to and following their being put to some particular use.

Do to the ever increasing demands made upon manufacturers and service personnel to exercise strict quality control standards torque tool testing machines to test the torque tools have become common pieces of equipment that are put regular use in many manufacturing and service facilities.

Those prior art torque tool testing machines that represent the present state of the art include electronic torque transducers with torque rods having arrays of strain gages, in bridge circuits, fixed thereto. The strain gages of the bridge circuits respond to torsional deflection of the rods and emit voltages that are proportional to those forces that cause the rods to deflect. The output voltages are processed and directed to numerical digital readout devices that display the forces in desired force units such as inch/pounds or foot/pounds.

Torque tools, such as, wrenches, when tested in the above noted testing machines are engaged with the torsion rods of the transducers in rotary driving engagement therewith and are held in fixed position relative to the machines. The machines are then operated to rotate or turn the transducers to torsionally load the tools. The extent to which the tools are loaded is numerically displayed by the digital read-out devises, as noted above. The tools included applied force indicating means such as dials or digital read-out devices. If the forces indicated by the force indicating means of the tools and the forces displayed by the testing machines are the same, when compared, the tools are serviceable. If those compared forces are dissimilar the tools are not serviceable and must be recalibrates, repaired, disposed of or otherwise treated as circumstances might require.

It is to be noted that the tools when tested, must be tested progressively, throughout wide ranges of forces. The ranges of forces might be as little as 2 to 20 inch ounces or 400 to 4000 foot pounds.

For testing tools provided to exert forces in a range of 2 to 20 inch ounces and tools provided to exert forces in ranges in 400 to 4000 foot pounds, two distinct transducers, each constructed and rated to handle one of those distinct ranges of forces must be utilized.

In practice there are no less than 18 commercially available torque transducers provided for use in torque tools testing machines, when those machines are to be used to test torque tools that are made to operate throughout different ranges of force.

When a torque tool is tested, particular care must be taken to be sure that the transducers installed in the torque testing machine is of a suitable size or capacity to handle the maximum torsial forces that will be directed through it during testing of the tool.

When Torque transducers are subjected to torsional forces that exceed the maximum force that they are designed and constructed to be subjected to, they are highly subject to being so seriously adversely effected that they will no longer function as intended. When the forgoing takes place the transducer are said to be "Burned-out". For example, a transducer provided or rated to withstand a maximum of 100 foot pounds of Torque can be safely subjected to 100 foot pounds of force; but when it is subjected to forces in excess of 100 foot pounds the likelihood that it will be burnt-out increases at an exponential rate. One such transducer might burn-out at 101 foot pounds; a substantial number might burn-out at 105 foot pounds; and relatively few will withstand 110 foot pounds without burning-out.

The cost of torque transducers provided for use in torque tool testing machines varies from as little as $500.00 to as much as $2500.00. Accordingly, the burning-out of transducers in torque tool testing machines is a costly loss. Further, when a transducer in a testing machine burns-out the machine is put out of service and further testing of torque tools is terminated until a costly new transducer is obtained and is installed in the machine (which requires the exercise of costly skilled labor). As the result of a forging the burning-out of a transducer in a torque tool testing machine is very often viewed as a "costly disaster" in many work places.

In the majority of those torque tool testing machines of the character here concerned with the torque transducers are carried by the output shaft of a reduction gear train. The reduction gear train has an input shaft with a manually rotatable hand-wheel. The gear trains provide the operators of the machines a mechanical advantage that enables the operators to turn the transducers extremely slowly and to direct great tordinal forces between the transducers and the tools with little applied forces to the hand-wheels.

When the applied forces are great, the reduction gears afford substantial resistance to manual turning of the hand-wheels. That resistance enable the operators of the testing machines to better control the operation thereof. However, when the applied forces are moderate to low so little resistance to turning of handwheels is generated that the operators of the machines are afforded little or no feel (tactile sensing) as to what the machines are doing. In either case there is a great tendency for the operators of the machines to turn the handwheels too far and to thereby overload and cause the transducers of the machines to burn-out.

In efforts to prevent the excessive turning of the handwheels and resulting burning-out of the transducers those in the prior art have provided various electrically actuated locking means that are automatically actuated when the voltage out-puts of the transducers reach those voltages that are emitted thereby when the maximum loads to which they are to be subjected to are reached.

The locking means provided by the prior art have included solenoid actuated ratchet pawls, bolts, jaw-clutches and the like, none of which has proven to be wholly reliable. While each of those prior art locking means is theoretically operative, each is dependent on a pawl or the like moving into engagement with and catching, grabbing, or engaging a tooth or the like on a rotating part in the reduction gear train. In each case, the interengagable parts of the locking means tend to ride over each other and, in many instances, are subject to accidentally disengagement when put to their intended use. As a result of the foregoing the prior art locking means are marginally effective and torque transducers continue to be burned-out in excessive numbers with resulting great economic losses.

OBJECTS AND FEATURES OF THE INVENTION

It is an object of this invention to provide a torque tool testing machine with a drive part, a torque transducer rotatably carried by the drive part, an electronic processor connected with the transducer and including an applied force indicating digital readout device, a reduction gear drive train with an out-put shaft engaged with and carrying the drive part, a manually rotatable input shaft with a hand-wheel fixed thereto, at least one pair of drivingly engaged spur gears; and, an improved locking means having a part that is selectively movable into and out of jammed locking engagement with the pair of spur gears; and, electric powered drive means to move the locking means between actuated locking and unactuated positions relative to the spur gears and connected with and controlled by the processor.

An object and a feature of the invention is to provide a testing machine of the general character referred to above wherein the locking means include a jamb plate with oppositely disposed gear tooth engaging surfaces and moveable into and out of interfering engagement between a next to mesh pair of advancing gear teeth on the pair of spur gears to stop advancing rotation of those gear teeth and operation of the gear train.

Yet another object of the invention is to provide an improved stopped means for a gear train of the general character referred to wherein the jamb plate is clampingly engaged between the next to mesh pair of advancing gear teeth on the pair of spur gears and that functions to direct equal and opposite stopping forces on those geared teeth and their gears.

Still another object and feature of the invention is to provide an improved gear locking means of the general character referred to above wherein the jamb plate has an inner end that engages and stops against one of the meshed together teeth on the pair of spur gears that occurs in advance of said next to meshed advancing teeth; and wherein the next to mesh advancing geared teeth engage and act to hold the jamb plate inward in stop engagement with said one of the meshed together teeth.

A further object and a feature of the invention is to provide an improved gear train locking means of the general character referred to above wherein the jamb plate, when in locking position with and between teeth of the pair of spur gears, is yieldingly moved outwardly by the meshed together tooth it engages when the pair of spur gears are rotated in reverse direction to enable that tooth to ride over the inner end of the plate, while the plate remains in locking position between the advancing next to meshed teeth on the pair of gears.

An object and a feature of the present invention is to provide a torque tool testing machine of the general character referred to above wherein the improved stop means includes two (2) jamb plates that are normally out of locking engagement with the pair of spur gears and wherein the two jamb plates are selectively actuated to stop rotation of spur gears in clockwise or counter-clockwise direction while allowing for substantial free rotation of those gears in counter-clockwise or clockwise directions.

Finally, it is an object and a feature of the present invention to provide a torque tool testing machine of the general character referred to above wherein each jamb plate of the improved locking means operates to positively stop rotation of the pair spur gears with which it is related, when it is operated to do so, and which cannot ride over or be interadvertantly moved from engagement with the teeth that engage it; and, that is urged and releasably held in locking position by the gear teeth that engage it.

The foregoing and other objects and features of the invention will be made apparent and will be fully understood from the following detailed description of the invention throughout description reference is made to the accompanying drawings.

DESCRIPTION OF THE DRAWINGS

FIG. 2 is a sectional view taken substantially as indicated by line 2—2 on FIG. 1;

FIG. 3 is a sectional view taken substantially as indicated by line 3—3 on FIG. 2;

FIG. 4 is a sectional view taken substantially as indicated by line 4—4 on FIG. 2;

FIG. 5 is an enlarged view of a portion of the structure shown in FIG. 4, with parts in another position;

FIG. 6 is an enlarged detailed sectional view taken substantially as indicated by line 6—6—6 on FIG. 2;

FIG. 7 is a sectional view taken substantially as indicated by line 7—7 on FIG. 6; and, FIG. 8 is a view of another form of stop means.

DETAILED DESCRIPTION OF THE INVENTION

Figure 1:
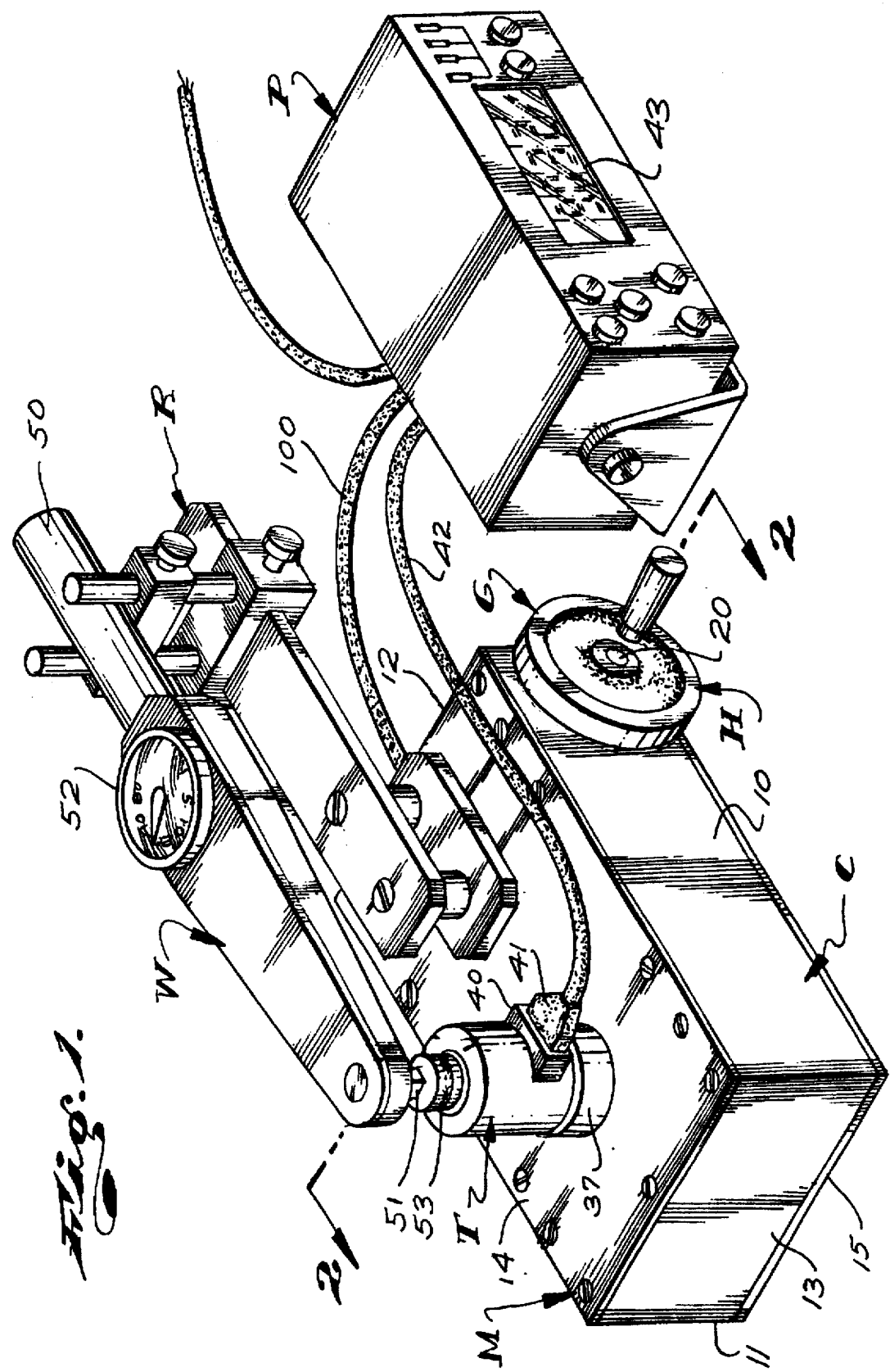
FIG. 1 is an isometric view of a torque tool testing machine embodying the present invention.

In FIG. 1 of the drawings I have illustrated a torque tool testing machine M embodying the present invention. But for details of a reduction gear train G and locking means L the machine M can very widely in design and in details of construction and is not unlike other prior art testing machines that are familiar to those who are skilled in the art.

In accordance with the above I will not burden at this disclosure with those details of design and construction of the machine M that are old and well known in the art and that are not directly related to the patentable aspects of my invention.

The machine M first includes a boxlike metal case C with flat vertical front rear and right and left-hand end walls 10, 11, 12, and 13 and flat horizontal top and bottom walls 14 and 15.

Within the case C are several frame parts F of suitable design and construction on which parts of the machine are fastened and supported.

The above referred to reduction gear train G is positioned within the case C and is carried by frame parts therein. The gear train G includes an elongate input shaft 20, and elongate intermediate shaft 21 that is spaced from and is parallel with the input shaft 20; and, an elongate output shaft 22 that is on an axis that is at right angle to the axes of the shafts 20 and 21.

The input shaft 20 drivingly carries a handwheel H that is located at the exterior of the case C and a drive spur gear 30, within the case C. The intermediate shaft drivingly carries a driven spur gear 31 that is in meshed driving engagement with the drive gear 30; and, a driven worm gear 32.

The output shaft 22 carries a turning gear 33 that is in meshed driving engagement with the worm gear 32 on the shaft 21. The shaft 22 has one end that projects through an opening in the case and is excessible at the exterior of the case.

An elongate electronic transducer T with a torque tool engaging torsion rod (not shown) is arranged in axile alignment with the shaft 22 and is drivingly connected to therewith, at said one end thereof, by a coupling part 37.

The drive spur gear 30 is smaller in diameter than the drivel spur gear 31 to effect a desired gear reduction. In practice a ratio of 4:1 might be advantageously provided between those gears.

The worm gear drive provided by the gears 32 and 33 is a reduction gear drive the ratio of which might, might be, be 20:1 or 50:1, as desired. The worm gear drive is self-locking and is such that the gear 33 only turns in response to turning of the gear 32.

With the gear train G described above it will be apparent that a substantial mechanical advantage is afforded from the input to the output of the gear train and that the operator of the machine can cause great Torsional forces to be attained at the output shaft 32 by the directing of little torsional force onto the input shaft 20 (by turning of the wheel H). Further, the gear reduction afforded enable the operator of the machine to effect turning of the output shaft 22 and the transducer T that is carried by it in small fractions of degrees.

In the case illustrated the input shaft 20 is horizontally disposed and is positioned within in the right-hand end portion of the case C and has a forward end portion that projects forwardly through an opening in the front wall 10 of the case. The front end portion of the shaft 20 carries the hand-wheel H. The shaft 20 is rotatably carried by a pair of axially spaces bearings 25 mounted on a vertical frame part F-1 within the case, as best shown in FIG. 3 of the drawings.

The gear 30 is positioned on the shaft 20 between the bearings 25.

The shaft 21 is horizontally disposed and is in spaced parallel relationship from the shaft 20, at the left-hand side thereof. The shaft 21 is rotatably carried by a pair of longitudinally spaced bearings 35 that are mounted on a vertical frame part F-2 within the case, as best shown in FIG. 3 of the drawings.

The driven spur gear 31 is mounted on the front-end of the shaft 21 on a radial plane that is parallel with the radial plane of the driven spur gear 30 and is in meshed driving engagement with the gear 30 as shown.

In the case illustrated the frame part F-2 is formed with a window or opening through which the right-hand portion of the gear 31 freely projects to engage the gear 30.

The worm gear 32 is positioned on the shaft 21 to occur between the bearings 35, a shown.

The output shaft 22 is vertically disposed and is positioned in the case is space relationship from and the left-hand side the worm gear 32. The shaft 22 is rotatably carried a pair of vertically carried bearings 36 (one of which is shown) mounted on a vertical frame part F-3 within the case C.

The upper end of the shaft 22 projects upwardly through an opening in the top wall 14 of the case and carries the above referred to mounting part 37.

The turning gear 33 is mounted on the shaft 22 between the pair of bearings 36 and is on a horizontal plane that intersects the turning axis of the worm gear 32. The gear 33 extends radially from the shaft 22 to established meshed driving engagement with the worm gear 32.

The gear train thus described is old in the art. That feature or parts of the noted gear train that are of particular significance with respect to the present invention resides in the inclusion and/or provision of the meshed together drive and driven spur gears 30 and 31 on the input and intermediate shafts 20 and 21.

Referring again to FIG. 1 of the drawings, the torque Transducer T is shown as an elongate vertically disposed cylindrical unit mounted atop the part 37 and is in rotating driving engagement therewith. The transducer occurs above and is freely excessible at the exterior of the case and is shown as including an electrical receptacle 40 at one side thereof and in which a plug 41 at the free end of a conductor cable 42 is engaged. The cable 42 extends from an electronic processor P that includes a digital readout device 43. The processor P receives the output voltage from a strain gage bridge circuit that is fixed to a torsion rod within the transducer (not shown). The Transducer is releasably drivingly coupled with a Torque Tool to be tested. The processor P converts voltages received from the transducer to suitable usable voltages which, when directed to the readout device 43, caused the devise 43 to numerically display the forces applied to the transducer in desired numerical forced units.

The processor P can be any selected one of a considerable number of commercially available electronic processor/controllers that are widely used throughout machine tool art and that are capable of performing those functions necessary in carrying out the present invention.

In addition to the foregoing, the machine M includes a reaction means R that receives and holds torque tools to be tested in working relationship with the case C and transducer T. In FIG. 1 of the drawings I have shown the torque tool being tested as a common elongate torque wrench W with a rear hand-grip portion 50, a work engaging head 51 projecting or depending from its forward end and an applied force indicating device such as a dial 52 (or digital readout device) intermediate its ends. The front-end portion of the wrench occurs above the transducer T and its work engaging head 51 is drivingly coupled with the torsion rod (not shown) of the transducer T by a common drive socket 53. The wrench W projects horizontally from the vertical axis of the transducer T toward the right-hand end of the machine M.

The reaction means R affords vertical support for the hand-grip 50 of the wrench and serves to prevent movement or turning of the grip and rear end portion of the wrench about the vertical turning axis of the transducer T.

In practice the design and details of the construction of the reactions means R are can be varied widely without in any way departing from or effecting the novelty and spirit of the present invention. In practice, when the testing machine is to be used to test a multiplicity of like Torque Tools a reaction means especially designed to engage and support those tools is or can be mounted on the case C and utilized.

With the structure thus far described it will be apparent that by turning the handwheel H (clockwise or counter clockwise) the transducer T is turned to torsionally load the wrench W. When the wrench W is torsionally loaded the force indicating dial or readout device 52 displays the forces that are applied through the wrench and the readout device 43 of the processor P displays the forces that are applied to the transducer T. If those two applied forces are the same it is known that the wrench W is in proper working condition. If those two forces are different (assuming the transducer to be accurate) it is know that the wrench is not suitable for further use and requires servicing, repair or replacement.

It is to be particularly noted that in the structure thus far described there is no means to prevent the operator of the machine M from overloading and causing the transducer T to burn-out.

The present invention next includes the above referred to locking means L. The locking means L is directly related and includes the two (2) interengaged drive and driven spur gears 30 and 31 and at least one and preferable a pair of jammed plates J & J' each of which is selectively movable between unactuated or unlocked and actuated or locking positions with the gears 30 and 31.

The jamb plates J & J' are alike. The jamb plate J is provided to lock the gears 30 and 31 against clockwise advanced turning of the gear 31 and the plate J' is provided to lock the gears against counter clock-wise advance turning of the gear 31. Since the plates are alike, in the following I will limit this disclosure to the plate J.

The spaced apart parallel turning axes of the gears 30 and 31 occur on and parallel with a common plane that extends there between. The opposing, meshed or engaging sides of the gears 30 and 31 occur on a tangential plane that is normal to said common plane and that is parallel with the turning axis of the gears. The tangential plane is that plane that extends between with the opposing sides of the gears and through those teeth of the gears that are in meshed engagement with each project.

In the form of the invention illustrated at least three (3) teeth on the gears 30 and 31 are in partially or fully meshed engagement. The meshed teeth are those teeth within the bracket X in FIG. 5 of the drawings. There is one tooth on each of the gears 30 and 31 that is advancing and is the next to engage and/or mesh tooth of the gear. The next to meshed advancing gear teeth are identified by the reference characters Y in FIG. 5 of the drawings. There is one disengaging tooth on each of the gears 30 and 31 that is, during advanced turning of the gear, moving out of meshed engagement with a tooth on its mating gear.

The plate J is a flat elongate metal plate with a straight transversely extending front gear tooth engaging inner end 80, a rear end portion 81, longitudinally extending opposite side edges 82 and flat, oppositely disposed, gear teeth stop surfaces 83 and 84.

The plate J is positioned to occur on the below noted tangential plane that extends between the gears 30 and 31, with its surfaces 83 and 84 parallel therewith and with its inner end 80 spaced outward from the above identified common plane on which the gears occur.

The plate J is normally in an unactuated or unlocked position where its inner end 80 is spaced below or outward from the meshed gear teeth X and outward below or from the advancing next to engage gear teeth Y, as clearly shown in FIGS. 4 & 5 of the drawings.

The plate J is selectively yieldingly moveable longitudinally inwardly or upwardly to an actuated or locking position where its inner end 80 engages and stops on the last to engage meshed gear tooth and to that position where the advancing next to engage and mesh teeth Y engage and stop on the stop surfaces 83 and 84, as clearly shown in FIG. 5 of the drawings.

It will be apparent that when the plate J is in its actuated locking position it positively stops advances turning of the gears 30 and 31 and locks the gear train G. It is to be particularly noted that as the plate J is yieldingly advanced inwardly to its actuated or locking position the teeth Y on the gears 30 and 31 are advancing circumferentially and inwardly as they engage the stop on the surfaces 83 and 84 and work to drive and to hold the plate inwardly in its fully actuated position; where the plate J is clampingly engaged between the teeth engageable Y.

In accordance with the above the means L of the present invention is such that the plate J, when moved to its actuated locking position is not required to search for or find and establish a latching relationship with one of the teeth of the gears 30 and 31 but is moved to a position where the advancing and next to mesh teeth Y engage it and work to move and hold it in its fully actuated position.

It is to be noted that the plate J can be and is yieldingly moved from its normal unactuated position to its actuated position with little or no force and with moderate accuracy since the gears 30 and 31 perform the primary work of guiding and moving the plate into its set stopped and fully actuated position.

Next, it is to be noted that when the plate J is fully actuated and stops forward advancing or turning of the gears 30 and 31 it does not stop or prevent reversed (backing off) turning of the gears. Upon reverse rotation of the gears the meshed gear to X with which the inner end 80 of the plate is engages urges the plate outwardly and the teeth Y are moved, in reverse direction, to release the plate from clamped engagement there between.

When turned in reverse direction as noted above, the geared tooth X that engages the plate only moves the plate outward a sufficient distance to allow the tooth X to slide or ride over the inner end 80 of the plate and the plate is not moved outwardly so far that it is moved from a position where the teeth Y will not forcibly engage and work upon the plate to move it to its fully actuated position, upon reestablishing advanced turning of the gears 30 and 31.

The invention next includes an operating means O that carries the plate J and that operates to normally hold the plate in its normal unactuated position and that yieldingly moves and urges the plate inwardly into its actuated or locking position. The means O can very widely in details of design and construction to meet the special needs of the different gear trains with which the means L might be related.

In the form of the invention illustrated the means O include an elongated rocker-arm 85 having front and rear-ends. The rocker arm is positioned in the case C on or close to the noted tangential plane that is parallel with the turning axis of the gears and that extends between the gears. The arm 85 is preferably supported at a suitable and desired pivotal point between its ends by a pivot support means M such as shown in FIGS. 6 and 7 of the drawings. The means M is mounted on the vertical frame part F-2.

The plate J is fixed to and carried by the front end of the arm 85 to occur on or in close parallel relationship with the tangential plane and to project from the arm with its inner end 80 directed toward the gears 30 and 31.

The means O next includes a suitable drive means S mounted within the case and connected with the rear end of the arm 85 and selectively operable to pivot the arm to move the plate J between its actuated and unactuated positions. The means S is shown as a fast operating spring loaded electro-magnetic solenoid the coil of which is mounted on the frame part F-2 and the armature of which is suitably connected with the rear-end of the arm 85, as clearly shown in the drawings.

The pivot support means M shown in FIGS. 6 and 7 of the drawings includes a pivot bolt 86 securely mounted on and projecting from the frame part F-2 and projecting through an opening in the arm 85 and through an opening 87 in a pivot block 88. The block 88 is fixed to the arm 85. The opening 87 in the block 88 is elongated (vertically) in cross section to allow the assembly of the block 88, arm 85 and plate J to move vertically a predetermined limited distance relative to the pivot bolt 86.

In addition to the foregoing the means M includes spring means carried by the block 88 that engages the bolt 86 to yieldingly urges and holds the block, arm and the plate assembly in an up position relative to the bolt. The spring means is shown as including spring barrel 89 fixed to and projecting upwardly from the block 88 and a spring 90 suitably set within a barrel and extending therefor into reactive engagement with the bolt, as illustrated.

In addition to the above noted parts the means M includes suitable spacers, washers and the like that enable proper positioning and free operation of the means M, in accordance with good practices.

With the means M illustrated and described above it will be apparent that when the operating means O is positioned to position and hold the plate J in it actuated or locked position, it does so yieldingly. Upon reverse turning of the gears 30 and 31, the plate is substantially free to be yieldingly moved outwardly in advance of the rearwardly turning tooth or teeth X that engage its inner end and to thereby allow for substantially free reverse turning or "backing-off" of the gears.

In FIG. 8 of the drawings I have shown another form of operating means O'. The means O' includes a solenoid S' mounted on the frame part F-2 with the axis of its armature as tangential place between the gears 20 and 21. The solinend is positioned outward from and is in axial alignment with its related plate J-3. The armature and plate are drivingly connected together by means of a spring loaded, lost motioned coupler 92 to normally yieldingly hold the plate J-3 in its fully actuated or stopped position (when the means is O' is actuated) and allows the gear teeth X against which the inner end of the plate J-3 is stopped, to be yieldingly moved outwardly a sufficient distance to allow the teeth X to ride over the inner end of the plate, when the pair of gears are backed-off or turned in reverse.

In yet another form of operating means (not shown) the rocker arm 85, shown in FIGS. 2 and 3 of the drawings, is replaced by a bell crank that enables the solenoid S to be positioned within the case of a machine of different design and in which the rocker arm 85 cannot be conveniently positioned. In that embodiment of the invention the means M is accommodated by and/or built into the hub of the bell crank or a spring-loaded lost motion coupler, such as the coupler 92 shown in FIG. 8 of the drawings, is utilized to connect the J and plate with the solenoid.

Finally, the solenoid S is engaged with a suitable power source (not shown) mounted within the case C or within the processor P. In accordance with common practices the power source is controlled by a suitable relay switching means (not shown) to selectively direct operating current to the solenoid in response to a control signal generated by the processor P. The processor P is adjusted and set or is programmed to generate and to conduct a command signal to the switching means for the when the voltage received from the transducer T and/or the processed voltage that is conducted to the digital readout device 43 of the processor is that voltage that is generated when the maximum force to which the transducer T is to be subjected to is reached.

As shown in FIG. 1 of the drawings a service cord 100 extends from the processor P to the case C of the machine M to conduct power to the solenoid or to direct a control signal to a power supply mounted within the case of the machine, whichever the case might be.

In the forgoing I have described the plate J and its related parts and means. The structure described works to selectively stop rotation of the gears 30 and 31 and to lock the gear train G in one direction. The plate J' and its related means and parts are the same as the plate J and its related means and parts but is related to the gears 30 and 31 to selectively stop advanced rotation and turning of the gears and to lock the gear train G when those gears are rotated in the other or opposite direction.

Throughout the drawings the means and parts that are related to the plate J' are identified by the same reference numbers and characters used to identify corresponding means and parts related to the plate J.

Having illustrating and described typical preferred forms and embodiments of my invention I do not wish to be limited to the specific details herein set forth but wish to reserve to myself any modification and/or variations that might appear to those skilled in the art and which fall the scope of the following claims.

Having Described My Invention I claim:

1. A torque tool testing machine including a case, a reaction device to hold a torque tool having a torque transmitting head and an applied torque indicating device in stationary position relative to the case, an electronic torque transducer with a torque transmitting device connected with the head and operating to emit a voltage that is proportional to torsional forces directed through it, a processor receiving and processing the voltage from the transducer and directing a voltage to a digital read-out device to cause that device to display the torsional forces directed through the transducer in digital force units; a reduction gear train comprising a series of related shafts and gears and including an out-put shaft in rotary driving engagement with the transducer, an input shaft with a manually engageable hand-wheel and at least one pair of related spur gear wheels on spaced apart parallel/shafts and each having elongate axially extending circumferentially spaced teeth that mesh when on a common tangential plane that extends between the gear wheels; stop means to stop advanced turning of the gear wheels in one direction and including a elongate plate with an outer-end portion, opposite sides, an elongate transversally extending inner-end parallel with the axes of the gears and oppositely disposed gear tooth engaging stop surfaces on planes that are parallel with said tangential plane; operating means connected with the plate to selectively move the plate between an outer position where it is spaced from interfering engagement with teeth on the gears to an inner position where its inner-end is stopped against one of the meshed teeth and where the advancing next to meshed teeth on the gears move circumferentially and inwardly into stopped engagement with their related stop surfaces of the plate; electric power drive means connected with and operable to drive the operating means to move the plate between its outer and inner positions, means connecting the drive means with the processor, the processor operates to cause the drive means to drive the operating means to move the plate from its outer position to its inner position when a voltage in the processor is reached that is proportional to the force directed through the transducer reaches a pre-determined set value.

2. The torque tool testing machine set forth in claim 1 wherein the operating means allows for limited yielding outward movement of the plate upon reverse rotation of the gear wheels and when the meshed gear tooth engaged by the inner-end of the plate moves the plate outward.

3. The torque tool testing machine set fourth in claim 1 that includes a second plate with related operating and drive means that is positioned relative to the pair of gears for selective movement into and out of interfering engagement between next to mesh teeth on the gear wheels when the gear wheels are turned in an opposite direction.

4. The torque tool testing machine set fourth in claim 1 that includes a second plate with related operating and drive means and that is positioned relative to the pairs of gears for selective movement into any of interfering engagement between next to mesh teeth when the gear wheels are turned in an opposite direction, the operating means for each plate allows for limited yielding outward movement of the plate upon reverse rotation of the gear wheels and when meshed gear tooth engage by the inner-end of the plate move the plate outwardly.

5. The torque tool testing machine set fourth in claim 1 wherein the operating means includes an elongate rocker arm with a front-end on which the plate is mounted, a rear-end with which the drive means is connected and a pivot means intermediate its ends and mounted within the case.

6. The torque tool testing machine set fourth in claim 1 wherein the operating means includes an elongate rocker arm with a front-end on which the plate is mounted, a rear-end with which the drive means is connected and a pivot means intermediate its ends and mounted within the case; the drive means includes a spring loaded electromagnetic solenoid with a coil mounted in the case and an armature connected with the rear-end of the arm.

7. The torque tool testing machine set fourth in claim 1 wherein the operating means includes an elongate rocker arm with a front-end on which the plate is mounted, a rear-end with which the drive means is connected and a pivot means intermediate its ends and mounted within the case; the drive means includes a spring loaded electromagnetic solenoid with a coil mounted in the case and an armature connected with the rear-end of the arm; said pivot means includes a pivot bolt carried by the case, a block carried by the arm and having an opening through which the bolt projects, the opening is elongated in cross-section on a plane that is substantially parallel with the direction that the plate moves when the plate moves from its inner position to its outer position, spring means carried by the block engage the bolt and normally yielding urges and holds the block arm and the plate in that position where the inner end of the plate stops against a meshed tooth and is engaged between the next to mesh advancing teeth of gear wheels.

* * * * *